(12) United States Patent
Wise

(10) Patent No.: US 6,688,402 B1
(45) Date of Patent: Feb. 10, 2004

(54) AERIAL FIREFIGHTING SYSTEM

(76) Inventor: Joseph C. Wise, 23 Alora Dr., Hermiston, OR (US) 97838

( * ) Notice: Subject to any disclaimer, the term of this patent is extended or adjusted under 35 U.S.C. 154(b) by 0 days.

(21) Appl. No.: 10/302,339

(22) Filed: Nov. 22, 2002

(51) Int. Cl.$^7$ ............................................. A62C 27/00
(52) U.S. Cl. ............................. 169/53; 169/46; 169/44; 169/12
(58) Field of Search ................. 169/9, 12, 46, 169/44, 47, 52, 53, 34, 74, 70; 239/171, 304, 307

(56) References Cited

U.S. PATENT DOCUMENTS

| | | | |
|---|---|---|---|
| 3,580,339 A | 5/1971 | Nance | 169/2 |
| 4,979,571 A | 12/1990 | MacDonald | 169/44 |
| 5,248,436 A | 9/1993 | Kovaletz | 210/693 |
| 5,385,208 A | 1/1995 | Baker et al. | 169/46 |
| 5,560,429 A | * 10/1996 | Needham | 169/53 |
| 5,699,862 A | * 12/1997 | Rey | 169/53 |
| 6,371,384 B1 | 4/2002 | Garcia | 239/10 |

* cited by examiner

Primary Examiner—Michael Mar
Assistant Examiner—Thach H Bui

(57) ABSTRACT

An aerial firefighting system for increasing the amount of firefighting foam available during an aerial application. The aerial firefighting system includes a turbo motor, a catalytic converter connected to the turbo motor for creating carbon dioxide, a first reservoir for storing a volume of foam agent, a bucket having a second reservoir for storing a volume of water, a plurality of fluid valves within a reservoir floor of the second reservoir, a partition member below the partition member having a plurality of first apertures, a dispensing member fluidly connected to the first reservoir for dispensing the foam agent within a mixing chamber, and a foam screen attached to a lower portion of the bucket above a lower opening within the bucket. The carbon dioxide is fed into the screen area where the water and foam agent enter in a mixed solution from the mixing chamber thereby creating $CO_2$ foam.

19 Claims, 6 Drawing Sheets

AERIAL FIREFIGHTING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to aerial firefighting systems and more specifically it relates to an aerial firefighting system for increasing the amount of firefighting material available during an aerial application.

2. Description of the Related Art

Aerial firefighting systems have been in use for years. The most common type of aerial firefighting system utilized with helicopters is the usage of a bucket capable of releasing large volumes of water upon a fire. The bucket is attached to the helicopter by a cable or similar structure along with a release cord or actuator that opens the lower portion of the bucket upon demand.

The main problem with conventional aerial firefighting systems is that they provide a limited amount of firefighting material to the scene of a fire. A further problem with conventional aerial firefighting systems is that they require the operator to repeatedly fill the bucket with water which is time consuming. A further problem with conventional aerial firefighting systems is that they do not produce a significant volume of carbon dioxide filled foam.

Examples of patented devices which may be related to the present invention include U.S. Pat. No. 5,385,208 to Baker et al.; U.S. Pat. No. 3,580,339 to Nance; U.S. Pat. No. 5,699,862 to Rey; U.S. Pat. No. 4,979,571 to MacDonald; U.S. Pat. No. 5,248,436 to Kovaletz; and U.S. Pat. No. 6,371,384 to Garcia.

While these devices may be suitable for the particular purpose to which they address, they are not as suitable for increasing the amount of firefighting foam available during an aerial application. Conventional aerial firefighting devices do not provide an adequate volume of foam during a single trip and require constant refilling of the water supply.

In these respects, the aerial firefighting system according to the present invention substantially departs from the conventional concepts and designs of the prior art, and in so doing provides an apparatus primarily developed for the purpose of increasing the amount of firefighting foam available during an aerial application.

BRIEF SUMMARY OF THE INVENTION

In view of the foregoing disadvantages inherent in the known types of aerial firefighting devices now present in the prior art, the present invention provides a new aerial firefighting system construction wherein the same can be utilized for increasing the amount of firefighting foam available during an aerial application.

The general purpose of the present invention, which will be described subsequently in greater detail, is to provide a new aerial firefighting system that has many of the advantages of the aerial firefighting devices mentioned heretofore and many novel features that result in a new aerial firefighting system which is not anticipated, rendered obvious, suggested, or even implied by any of the prior art aerial firefighting systems, either alone or in any combination thereof.

To attain this, the present invention generally comprises a turbo motor, a catalytic converter connected to the turbo motor for creating carbon dioxide, a first reservoir for storing a volume of foam agent, a bucket having a second reservoir for storing a volume of water, a plurality of fluid valves within a reservoir floor of the second reservoir, a partition member below the partition member having a plurality of first apertures, a dispensing member fluidly connected to the first reservoir for dispensing the foam agent within a mixing chamber, and a foam screen attached to a lower portion of the bucket above a lower opening within the bucket. The carbon dioxide is fed into the screen area where the water and foam agent enter in a mixed solution from the mixing chamber thereby creating CO2 foam.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an aerial firefighting system that will overcome the shortcomings of the prior art devices.

A second object is to provide an aerial firefighting system for increasing the amount of firefighting foam available during an aerial application.

Another object is to provide an aerial firefighting system that reduces the number of water refilling drops required by a firefighting helicopter.

An additional object is to provide an aerial firefighting system that efficiently utilizes water contained within a bucket.

A further object is to provide an aerial firefighting system that provides a carbon dioxide firefighting foam to the scene of a fire.

Another object is to provide an aerial firefighting system that may be applied in an aerial or non-aerial manner.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as-the same becomes better understood when considered in conjunction with the accompanying drawings, in which like reference characters designate the same or similar parts throughout the several views, and wherein.

DETAILED DESCRIPTION OF THE INVENTION

Figure 1:
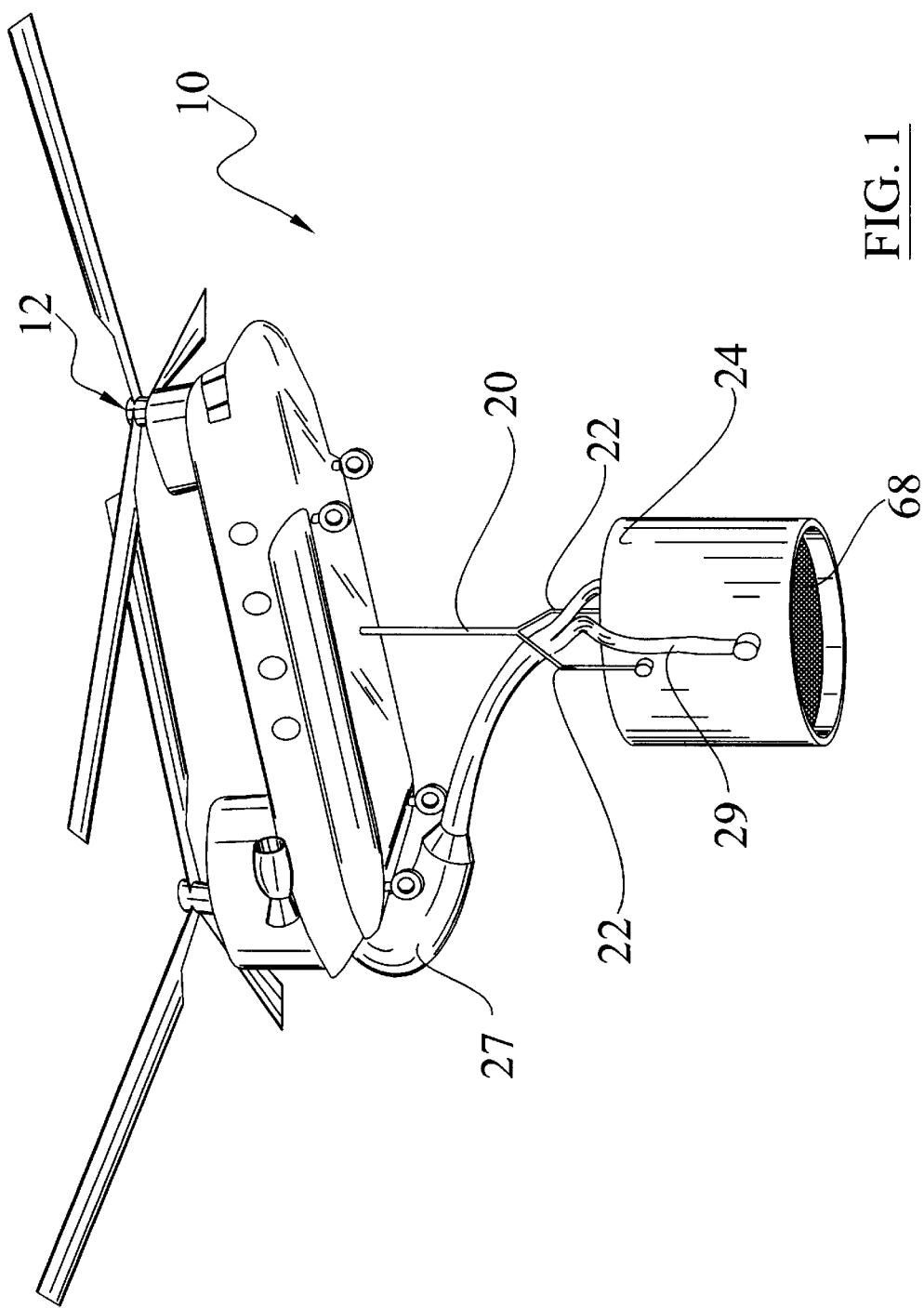
FIG. 1 is a lower perspective view of the present invention supported upon a firefighting helicopter.

Turning now descriptively to the drawings, in which similar reference characters denote similar elements throughout the several views, FIGS. 1 through 6 illustrate an aerial firefighting system 10, which comprises a turbo motor 60, a catalytic converter 62, volume of foam agent, a bucket 24 having a second reservoir 40 for storing a volume of water, a plurality of fluid valves 42 within a reservoir floor 52 of the second reservoir 40, a partition member 26 below the partition member 26 having a plurality of first apertures 28, a dispensing member 50 fluidly connected to the first reservoir 30 for dispensing the foam agent within a mixing chamber, and a foam screen 68 attached to a lower portion of the bucket 24 above a lower opening within the bucket 24. The carbon dioxide is fed into the screen area where the water and foam agent enter in a mixed solution from the mixing chamber thereby creating CO2 foam.

Figure 4:
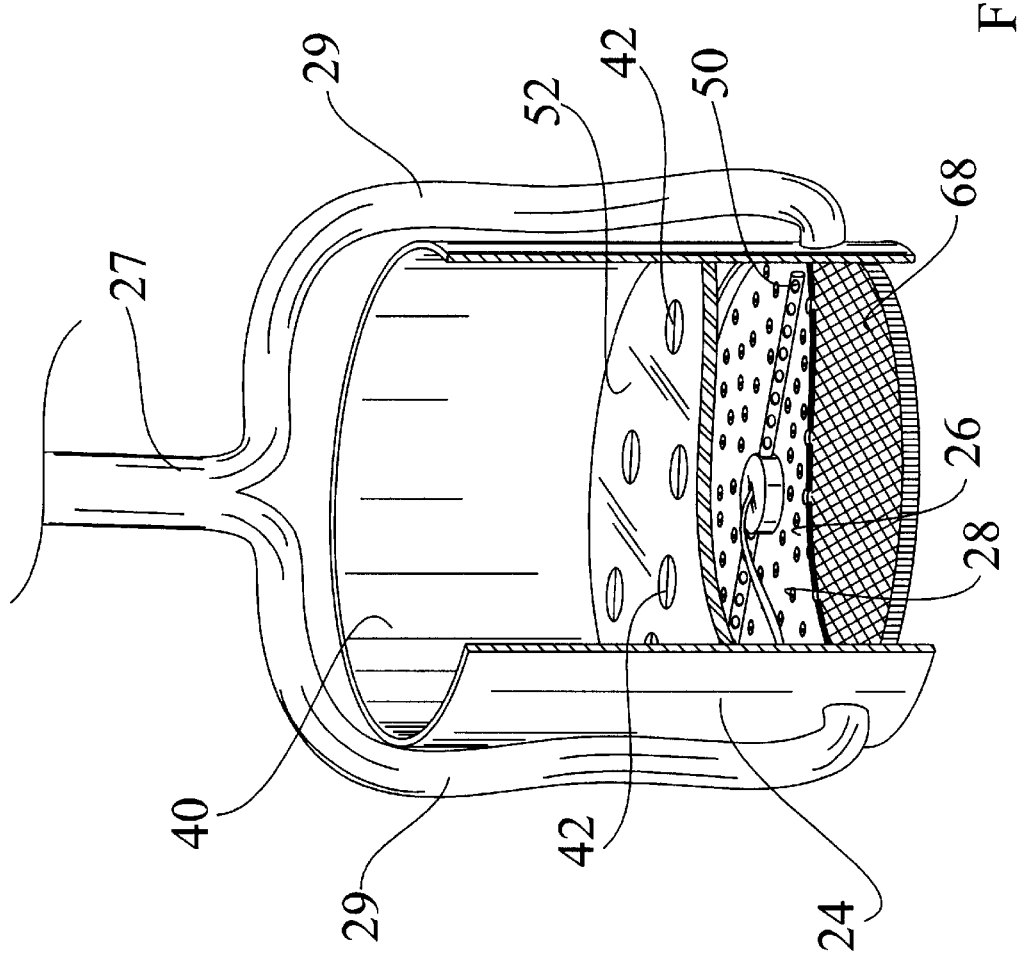
FIG. 4 is a cutaway upper perspective view of the bucket of the present invention.
Figure 5:
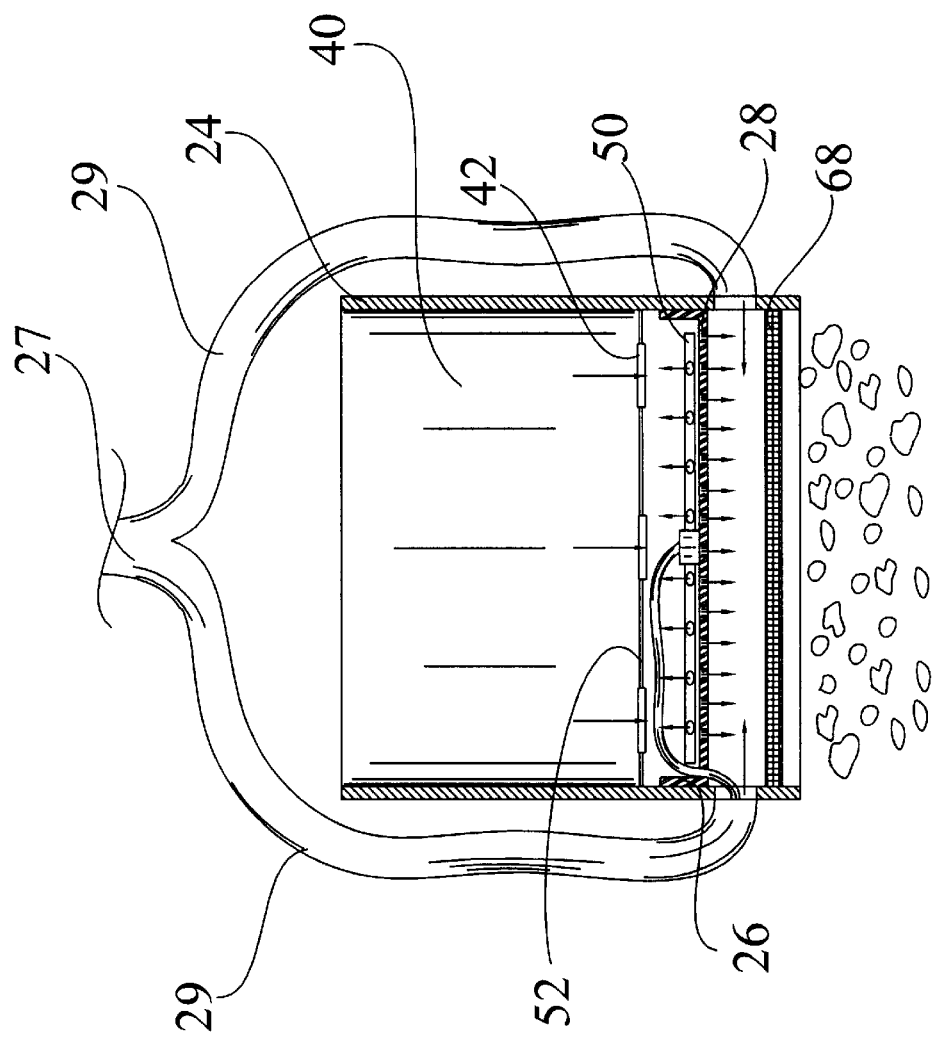
FIG. 5 is a side cutaway view of the bucket of the present invention.

As shown in FIGS. 1, 4 and 5 of the drawings, the bucket 24 has a second reservoir 40 within the upper portion thereof for storing a volume of water or other fluid. The bucket 24 may be structure similar to conventional buckets 24 utilized within the aerial firefighting industry. The bucket 24 preferably has an upper opening as shown in FIGS. 4 and 5 of the drawings. The bucket 24 may have various shapes, sizes and structures as desired. The bucket 24 may be supported from the helicopter 12 by an elongate support member 20 and one or more side supports 22 as shown in FIG. 1 of the drawings. The support member 20 and the side supports 22 may be comprised of various materials and structures such as but not limited to metal cable.

Figure 6:
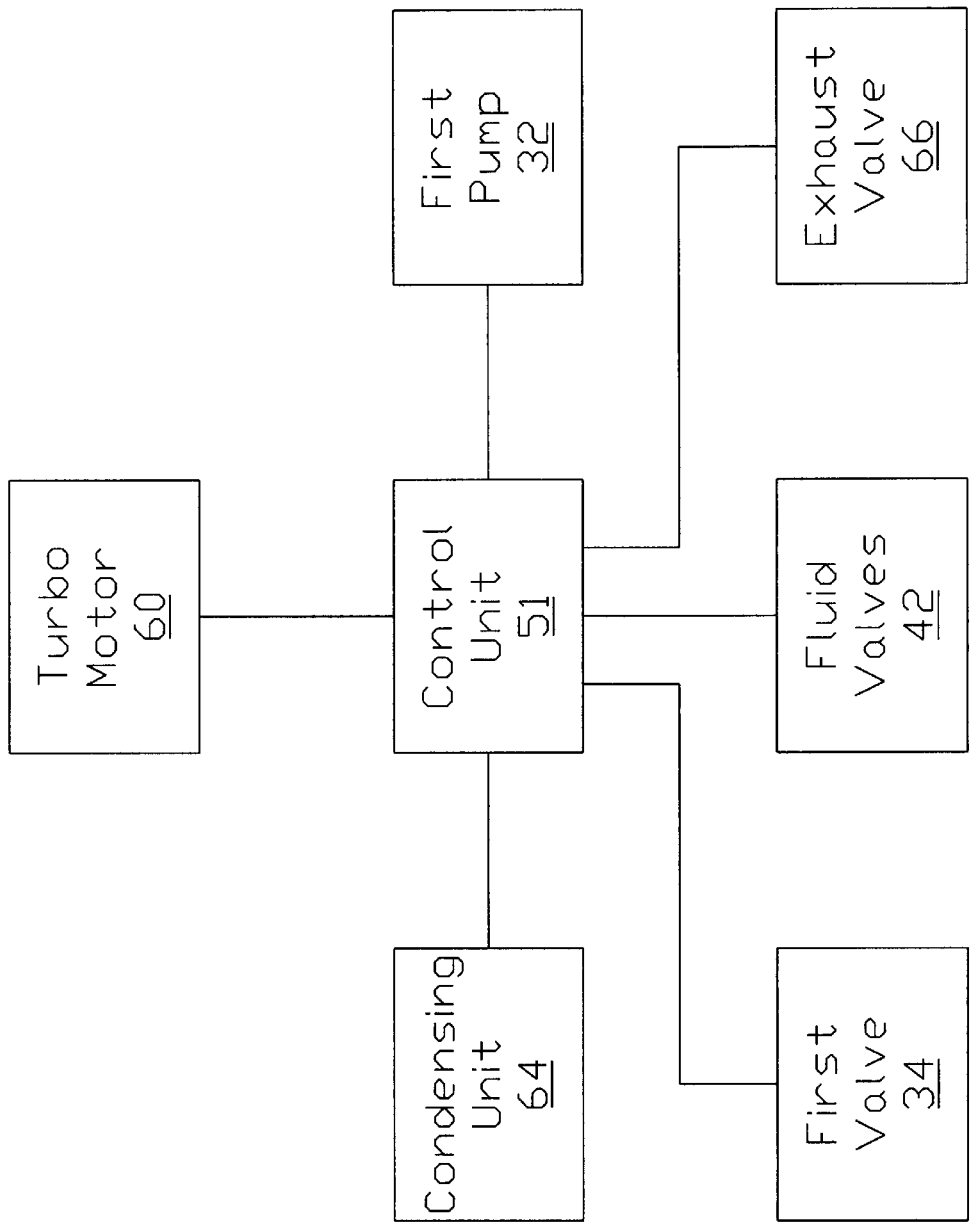
FIG. 6 is a block diagram of the electrical components of the present invention.

As shown in FIGS. 4 and 5 of the drawings, the second reservoir 40 has a reservoir floor 52 that has one or more fluid valves 42 within. The fluid valves 42 are in communication with the control unit 51 and are controlled by the control unit 51 to open when water from the second reservoir 40 is desired to be input into the mixing chamber directly below the reservoir floor 52 as shown in FIGS. 5 and 6 of the drawings. The fluid valves 42 may be comprised of various valve structures commonly utilized. The fluid valves 42 are preferably distally spaced throughout the reservoir floor 52 as best illustrated in FIG. 4 of the drawings.

As best illustrated in FIGS. 4 and 5 of the drawings, a partition member 26 is positioned within the bucket 24 beneath the reservoir floor 52. The partition member 26 includes a plurality of first apertures 28 spaced throughout the partition member 26. The partition member 26 and the reservoir floor 52 form the mixing chamber where the water and the foam agent are mixed together as best illustrated in FIG. 5 of the drawings.

FIGS. 4 and 5 further illustrate a dispensing member 50 positioned within the mixing chamber that preferably dispenses the foam agent upwardly toward the reservoir floor 52. The dispensing member 50 has a plurality of nozzles within that fluidly dispense the foam agent from thereof in various patterns and flow rates. The dispensing member 50 is preferably rotatably supported upon the partition member 26 and rotates within the mixing chamber by the force of the foam agent exiting the dispensing member 50 or by a separate drive unit thereby thoroughly mixing the foam agent with the water.

FIGS. 4 and 5 further illustrate a foam screen 68 attached within the bucket 24 beneath the partition member 26 creating a foam chamber that receives the mixed solution of water and foam agent. The foam screen 68 is comprised of any screen material that is capable of creating foam from the water/foam solution with pressurized CO2. The aperture sizes and shapes within the foam screen 68 may vary depending upon the type of CO2 desired to be created.

Figure 2:
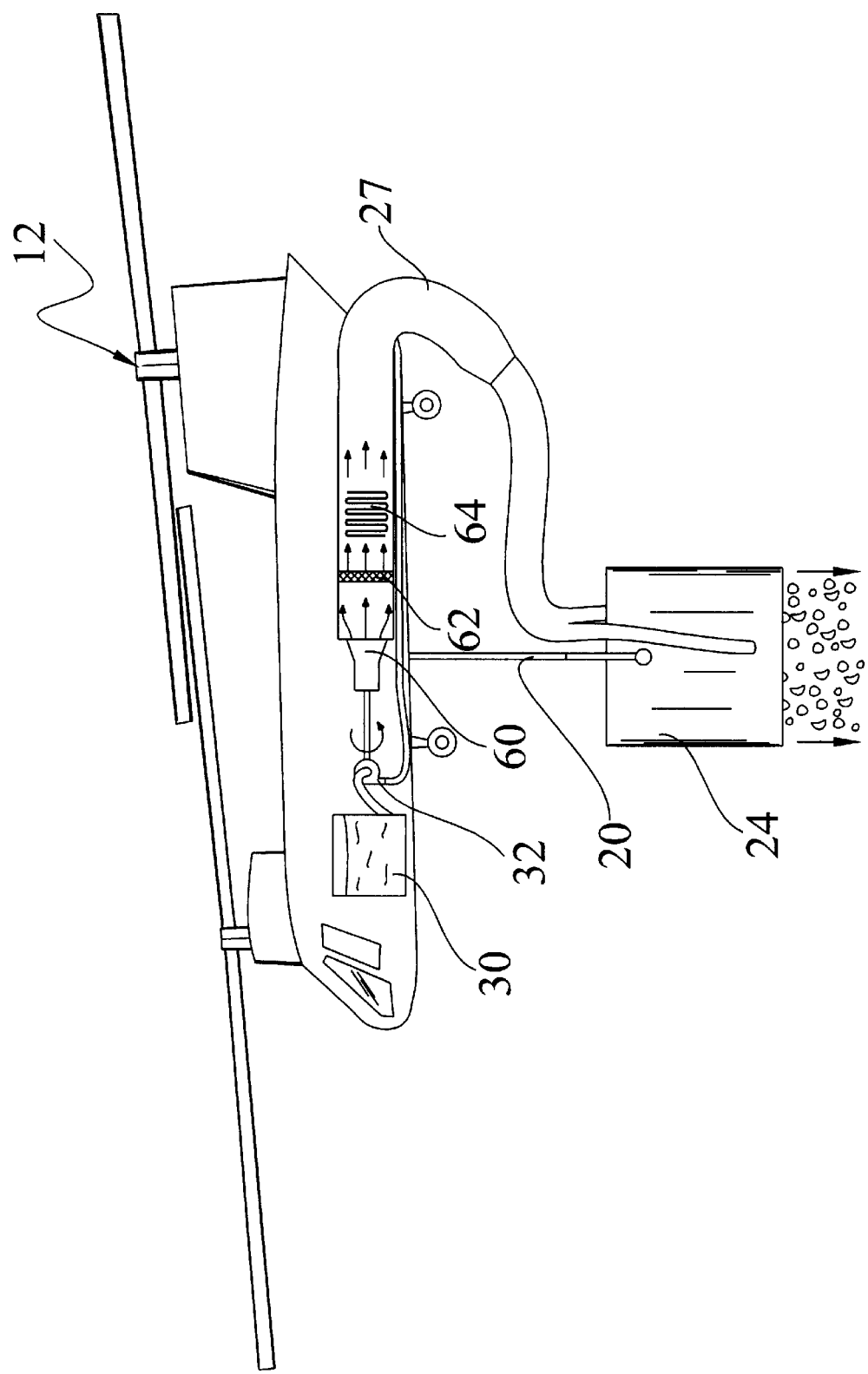
FIG. 2 is a side view of the present invention within the firefighting helicopter.
Figure 3:
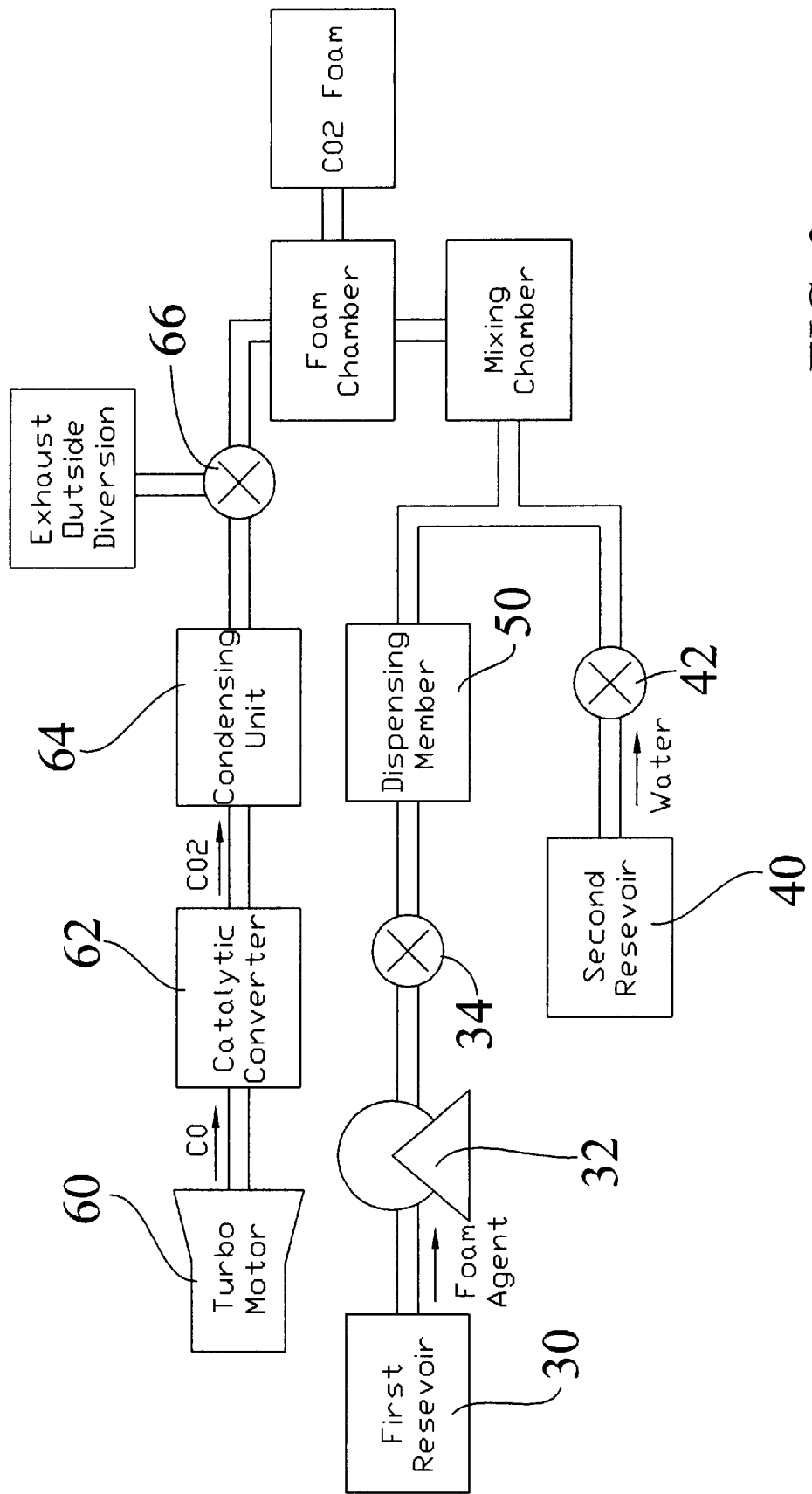
FIG. 3 is a block diagram illustrating the main components of the present invention.

FIGS. 2 and 3 illustrate the usage of the first reservoir 30 containing the foam agent. The foam agent may be comprised of any commonly utilized foam agent capable of generating foam when combined with water and carbon dioxide. The first reservoir 30 is positioned within the helicopter 12 as shown in FIG. 2 of the drawings. The first reservoir 30 is fluidly connected to a first pump 32 where a first valve 34 controls the flow of the foam agent to the dispensing member 50. The first pump 32 and the first valve 34 are in communication with the control unit 51 and controlled by the control unit 51. The operator is able to control the flow rate of foam agent dispensed into the mixing chamber depending upon the conditions and usage requirements.

As shown in FIGS. 2 and 3 of the drawings, the turbo motor 60 is positioned within the helicopter 12 and may drive the first pump 32 using a drive connection. The turbo motor 60 creates a pressurized flow of heated carbon dioxide and carbon monoxide which passes through a catalytic converter 62 wherein the carbon monoxide is converted to carbon dioxide. The heated carbon dioxide then passes through a condensing unit 64 which cools the gases. The carbon dioxide is then fed to the foam chamber through a main tube 27. An exhaust valve 66 is positioned within the main tube 27 for allowing the carbon dioxide gases to be emitted out from the main tube 27 if desired.

One or more side tubes 29 may fluidly extend from the main tube 27 to fluidly connected to sides of the foam chamber as shown in FIGS. 4 and 5 of the drawings. The delivery hose fluidly connected to the dispensing member 50 and the first pump 32 may extend within the main tube 27 and one of the side tubes 29.

In use, the first reservoir 30 is filled with a foam agent and the second reservoir 40 is filled with water or other fluid with the fluid valves 42 closed. Upon approaching the fire, the operator of the helicopter 12 manipulates the control unit 51 thereby actuating the first pump 32 to pump foam agent to the dispensing member 50, opening the fluid valves 42 and operating the turbo motor 60. When the fluid valves 42 are opened, the water from the second reservoir 40 falls into the mixing chamber where the water is mixed with the foam agent by the dispensing member 50 as shown in FIG. 5 of the drawings. The mixture of water/foam agent then passes through the first apertures 28 within the partition member 26 into the foam chamber. The carbon dioxide is also input into the foam chamber by the main tube 27 as shown in FIG. 5 of the drawings. The water/foam agent is thereafter forced through the foam screen 68 by the carbon dioxide thereby creating CO2 foam as shown in FIG. 5. The CO2 foam is dispensed upon the fire thereby extinguishing the fire. This process continues until the water within the second reservoir 40 is fully utilized. The operator of the helicopter 12 then proceeds to fill the second reservoir 40 for another round of CO2 foam generation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An aerial firefighting system for use upon a firefighting helicopter, comprising:
    a first reservoir for storing a volume of foam agent;
    a bucket having a lower opening, a second reservoir with a reservoir floor, a plurality of fluid valves within said reservoir floor, a partition member having a plurality of apertures below said reservoir floor forming a mixing chamber between thereof, and a foam screen positioned below said partition member forming a foam chamber between thereof;
    a support member attached between said bucket and said firefighting helicopter;
    a turbo motor for generating carbon dioxide gas;
    a main tube fluidly connected to said turbo motor and said foam chamber of said bucket;
    a dispensing member within said mixing chamber having a plurality of nozzles and fluidly connected to said first reservoir; and
    a control unit in communication with said fluid-valves and said turbo motor.

2. The aerial firefighting system of claim 1, including a catalytic converter fluidly attached within said main tube.

3. The aerial firefighting system of claim 1, including a condenser unit within said main tube for cooling said carbon dioxide gas.

4. The aerial firefighting system of claim 1, wherein said dispensing member is pivotally attached to said partition member.

5. The aerial firefighting system of claim 4, wherein said dispensing member rotates by the force of said foam agent being emitted from said plurality of nozzles.

6. The aerial firefighting system of claim 1, including an exhaust valve within said main tube.

7. The aerial firefighting system of claim 1, including a first pump fluidly connected between said first reservoir and said dispensing member.

8. The aerial firefighting system of claim 7, including a first valve fluidly connected between said first pump and said dispensing member.

9. The aerial firefighting system of claim 1, wherein said first reservoir is positioned within said firefighting helicopter.

10. The aerial firefighting system of claim 1, wherein said main tube includes a plurality of side tubes that are fluidly connected to said foam chamber.

11. An aerial firefighting system for use upon a firefighting helicopter, comprising:
    a first reservoir for storing a volume of foam agent;
    a bucket having a lower opening, a second reservoir with a reservoir floor, a plurality of fluid valves within said reservoir floor, a partition member having a plurality of apertures below said reservoir floor forming a mixing chamber between thereof, and a foam screen positioned below said partition member forming a foam chamber between thereof;
    a support member attached between said bucket and said firefighting helicopter;
    a turbo motor for generating carbon dioxide gas;
    a main tube fluidly connected to said turbo motor and said foam chamber of said bucket;
    a dispensing member within said mixing chamber having a plurality of nozzles and fluidly connected to said first reservoir;
    control unit in communication with said fluid valves and said turbo motor;
    a catalytic converter fluidly attached within said main tube; and
    a condenser unit within said main tube for cooling said carbon dioxide gas.

12. The aerial firefighting system of claim 1, wherein said dispensing member is pivotally attached to said partition member.

13. The aerial firefighting system of claim 12, wherein said dispensing member rotates by the force of said foam agent being emitted from said plurality of nozzles.

14. The aerial firefighting system of claim 11, including an exhaust valve within said main tube.

15. The aerial firefighting system of claim 11, including a first pump fluidly connected between said first reservoir and said dispensing member.

16. The aerial firefighting system of claim 15, including a first valve fluidly connected between said first pump and said dispensing member.

17. The aerial firefighting system of claim 11, wherein said first reservoir is positioned within said firefighting helicopter.

18. The aerial firefighting system of claim 11, wherein said main tube includes a plurality of side tubes that are fluidly connected to said foam chamber.

19. A method of generating firefighting foam from a firefighting helicopter using an aerial firefighting system having a first reservoir for storing a volume of foam agent, a bucket having a lower opening, a second reservoir with a reservoir floor, a plurality of fluid valves within said reservoir floor, a partition member having a plurality of apertures below said reservoir floor forming a mixing chamber between thereof, and a foam screen positioned below said partition member forming a foam chamber between thereof, a support member attached between said bucket and said firefighting helicopter, a turbo motor for generating carbon dioxide gas, a main tube fluidly connected to said turbo motor and said foam chamber of said bucket, a dispensing member within said mixing chamber having a plurality of nozzles and fluidly connected to said first reservoir, a control unit in communication with said fluid valves and said turbo motor, a catalytic converter fluidly attached within said main tube, and a condenser unit within said main tube for cooling said carbon dioxide gas, said method comprising the steps of:

(a) operating said turbo motor thereby creating exhaust gases;

(b) passing said exhaust gases through said catalytic converter for converting carbon monoxide gas to carbon dioxide gas;

(c) passing said exhaust gases through said condenser unit for cooling said exhaust gases;

(d) dispensing said foam agent to said dispensing member; and (e) opening said fluid valves of said second reservoir.

* * * * *